July 5, 1949.     E. E. CHURCH     2,475,178
CLUTCH FOR GOVERNORS
Filed March 5, 1945     2 Sheets-Sheet 1
Fig.-1
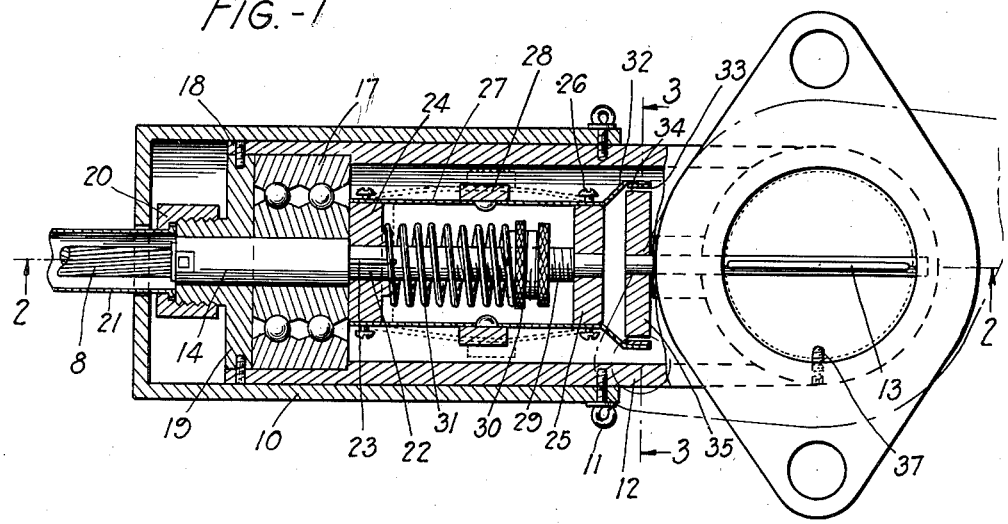
Fig.-2
Fig.-3
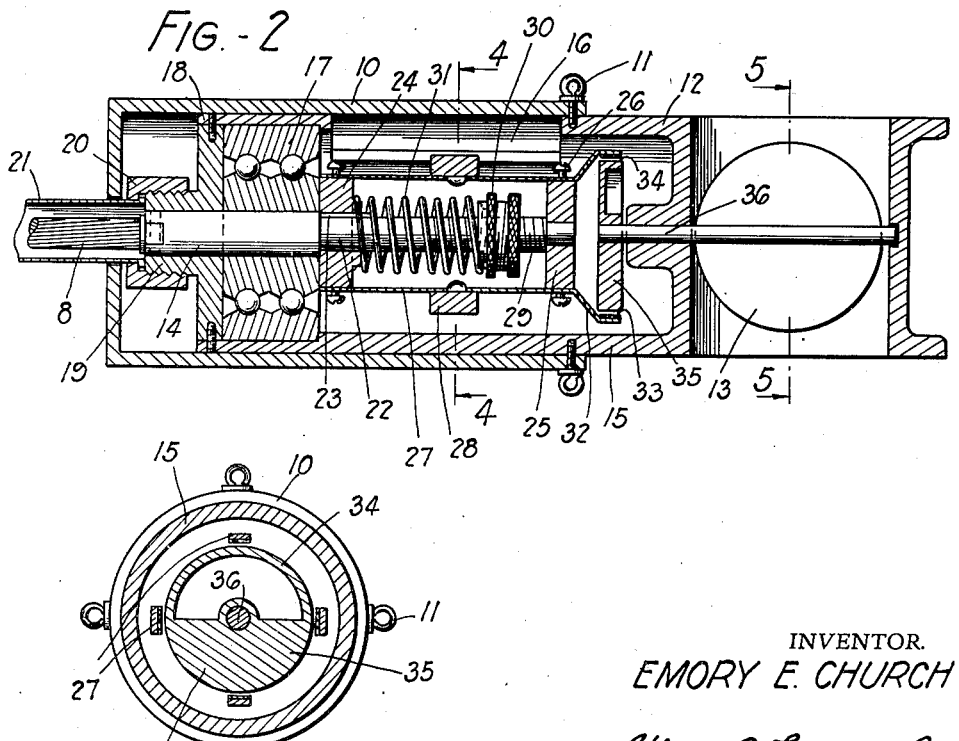
INVENTOR.
EMORY E. CHURCH
BY Victor J. Evans & Co.
ATTORNEYS July 5, 1949.

E. E. CHURCH 2,475,178

CLUTCH FOR GOVERNORS

Filed March 5, 1945

INVENTOR.
EMORY E. CHURCH

BY *Victor J. Evans & Co.*

ATTORNEYS

Patented July 5, 1949

2,475,178

UNITED STATES PATENT OFFICE 2,475,178

CLUTCH FOR GOVERNORS

Emory E. Church, Compton, Calif.

Application March 5, 1945, Serial No. 581,115

1 Claim. (Cl. 192—105)

My present invention, in its broad aspect, has reference to improvement in governors for limiting the speeds of automobiles, trucks and other power driven vehicles, and the principle of its operation may be applied broadly to any power plant. I provide a connection from the speedometer drive to the carburetor butterfly which is controlled by a centrifugal governor so that the functioning of the carburetor is regulated to reduce or control speeds when a predetermined maximum speed is reached by the vehicle. My invention is especially desirable for preventing unconscious excessive speeds which would violate statutory speed limits, limits of speed set for breaking in a new car and the like. It may also be used as a restraint on the speeds of persons found guilty of speeding by a court, or where several members of a family (including children) use a car to prevent excessive speeds by those inclined to be reckless.

My governor is adjustable to be responsive to predetermined speeds and it permits running the engine at any speed provided the ground speed of the vehicle does not exceed the predetermined speed limit. Furthermore, my device may be sealed against tampering, and in the event the drive connection for the governor is broken or damaged, the operation of the motor or vehicle is not impaired.

Other and equally important objects and advantages of my invention are: (1), to provide a speed regulating and limiting device which is positive in operation, and which is sturdy, accurate and practical; (2), to provide a governor for motor vehicles which is operated through the speedometer drive to be responsive to ground speeds to regulate the action of the carburetor to reduce and restrict speed when the certain maximum speed is reached or exceeded, and which does not interfere with the action of the motor below the predetermined maximum speed, and (3), to provide a device which is relatively simple in construction, and effective in operation, with no exposed or fragile parts which are likely to become broken or out of order, and which can be quickly applied to motor vehicles.

Still other and equally important objects and advantages will be apparent from the following description and drawings, but it is to be understood that changes in form, size, shape, materials, construction and arrangement of parts may be made without departing from my broad inventive concept or the scope of the appended claims.

In the drawings wherein I have illustrated a preferred form of my invention:

Figure 1 is a longitudinal section;

Figure 2 is a longitudinal section taken on the line 2—2 of Figure 1;

Figure 3 is a transverse section taken on the line 3—3 of Figure 1;

In the drawings wherein like characters of reference are used to designate like or similar parts throughout the several views:

Figure 6:
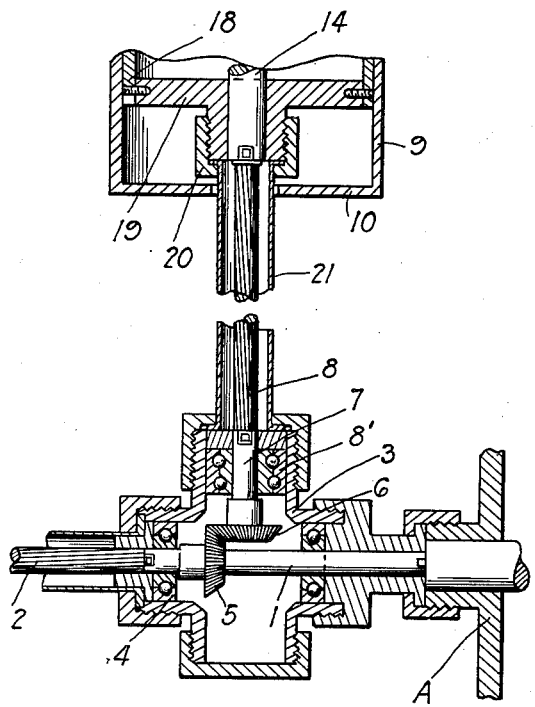
Figure 6 is a section through the gear box or gear drive from the speedometer connection to the transmission.
Figure 4:
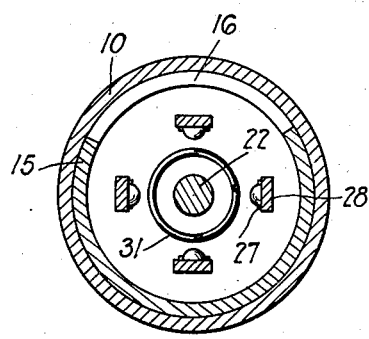
Figure 4 is a transverse section taken on the line 4—4 of Figure 2.

The numeral 1 designates a connection with the transmission (not shown) from the speedometer drive shaft 2. On the transmission A is suitably mounted a gear box 3 through which the connection 1 runs and with which the speedometer drive shaft 2 is anti-frictionally journaled as at 4. The connection carries a beveled drive gear 5 meshing with a beveled driven gear 6 on the shaft 7 journaled in an anti-frictional bearing 8' in the gear box 3. Shaft 7 is connected with a flexible shaft 8 which leads to my governor, generally designated by 9.

My governor is mounted between the intake manifold and carburetor and has a casing 10 having a sealing connection through eye screws 11 with the extended flanges of a sleeve 12 in which is mounted a butterfly valve 13 to the carburetor (not shown). The shaft 8 extends through one end of the casing 10 and is connected to a governor shaft 14. A cylindrical frame 15 or housing formed by an extension of the butterfly valve sleeve 12 has an open side 16 giving access to the governor, and one end of the frame or housing 15 carries a ball-bearing journaling device 17 for the shaft 14. The end 18 of the sleeve has a bearing 19 for the shaft 14 and a threaded nipple 20 to which a shield 21 for the flexible shaft 8 is connected. The shaft 14 is reduced as at 22 and has a key 23. Mounted on the shaft for sliding movement only by reason of the key 23 is the sliding disc 24 of a centrifugal governor. The fixed disc of the governor is designated 25 and is carried on the end of the shaft 14. Between discs 24 and 25 are loosely attached by shoulder type screws 26 the flexible governor plates 27 which are weighted as at 28 to spring outwardly to the dotted line position of Figure 1 when the shaft 14 is rotated. The reduced part of shaft 14 is threaded as at 29 to receive an adjusting nut 30 bearing against a spring 31 which bears against the sliding disc 24 so that the action of the governor may be regulated through the nut 30. Tampering is prevented by the seal through eye screws 11.

Figure 7:
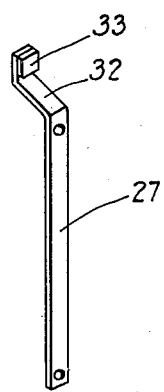
Figure 7 is a perspective view of one of the governor plate springs and clutch arm.
Figure 5:
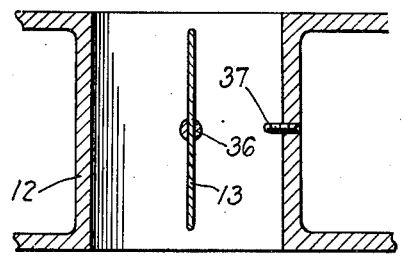
Figure 5 is a section taken on the line 5—5 of Figure 2.

Each plate 27 has an extension 32 which extends upwardly at an angle and outwardly beyond disc 25 as shown in Figures 1, 2 and 7. Each plate extension carries a head 33 which is disposed to bear against the flange 34 of a clutch disc 35 when the plates 27 are bowed outwardly by the movement of shaft 14 so that when the clutch disc is engaged, the shaft 36 coupled with the clutch disc 35 is rotated to turn the butterfly valve 13 to regulate the amount of combustible mixture delivered to the carburetor (not shown) thereby regulating the speed of the engine. A stop screw 37 is provided to limit the turning movement of the butterfly valve. It will be noted that the clutch disc is weighted as at 38—see Figure 3—to return the butterfly valve to open position when the clutch is released.

From the foregoing, it is believed that the operation and advantages of my invention will be apparent, but it is again emphasized that the interpretation of the scope of my invention should only be conclusive when made in the light of the subjoined claim.

I claim:

A device of the character described comprising a shaft having a keyed portion, a disc fixed upon the shaft, a disc slidably mounted upon the keyed portion of the shaft, an adjusting nut threaded upon the shaft between the discs, a spring surrounding the shaft and bearing against the nut and the slidable disc, a plurality of plates of spring metal said plates being loosely attached at one end to said slidably mounted disc and loosely connected inwardly of the other end thereof to the disc fixed on the shaft, and said plates interconnecting the discs and carrying weights at a position centrally of their connections to said discs and extensions of said plates beyond the fixed disc, whereby when said plates are bowed outwardly by said weights and said extensions are moved inwardly by reason of their loose connections with said discs during rotation of said shaft said members form externally contracting clutch members.

EMORY E. CHURCH.

REFERENCES CITED

The following references are of record in the file of this patent:

UNITED STATES PATENTS

| Number | Name | Date |
|---|---|---|
| 316,848 | Therkelsen | Apr. 28, 1885 |
| 791,695 | Hudson et al. | June 6, 1905 |
| 1,009,675 | Lord, Jr. | Nov. 21, 1911 |
| 1,062,780 | Kennedy | May 27, 1913 |
| 1,236,449 | Kirkman | Aug. 14, 1917 |
| 1,251,176 | Braun | Dec. 25, 1917 |
| 1,897,324 | Murrow | Feb. 14, 1933 |
| 2,251,186 | Deaner et al. | July 29, 1941 |
| 2,272,953 | Rooney | Feb. 10, 1942 |
| 2,376,665 | Cross | May 22, 1945 |